United States Patent
Nagano et al.

(10) Patent No.: US 11,442,443 B2
(45) Date of Patent: Sep. 13, 2022

(54) MONITORING DEVICE, METHOD FOR MONITORING TARGET DEVICE, AND PROGRAM

(71) Applicant: Mitsubishi Hitachi Power Systems, Ltd., Kanagawa (JP)

(72) Inventors: Ichiro Nagano, Yokohama (JP); Kuniaki Aoyama, Tokyo (JP); Mayumi Saito, Tokyo (JP); Shintaro Kumano, Tokyo (JP); Katsuhiko Abe, Yokohama (JP); Toru Tanaka, Yokohama (JP); Takahiro Yamauchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 863 days.

(21) Appl. No.: 16/099,577

(22) PCT Filed: May 31, 2017

(86) PCT No.: PCT/JP2017/020200
§ 371 (c)(1),
(2) Date: Nov. 7, 2018

(87) PCT Pub. No.: WO2017/209167
PCT Pub. Date: Dec. 7, 2017

(65) Prior Publication Data
US 2019/0187676 A1    Jun. 20, 2019

(30) Foreign Application Priority Data
Jun. 1, 2016   (JP) .............................. JP2016-110336

(51) Int. Cl.
*G05B 23/00*   (2006.01)
*G05B 23/02*   (2006.01)
(Continued)

(52) U.S. Cl.
CPC ......... *G05B 23/0248* (2013.01); *F01D 25/00* (2013.01); *F01D 25/08* (2013.01);
(Continued)

(58) Field of Classification Search
CPC ................ G05B 23/0248; G05B 23/02; G05B 23/0221; G05B 23/0235; F01D 25/00; F01D 25/08; F02C 7/00; F02C 7/22
See application file for complete search history.

(56) References Cited

U.S. PATENT DOCUMENTS

2003/0199781 A1* 10/2003 Tsuboshita ........... A61B 5/4094
600/544
2005/0096759 A1*  5/2005 Benjamin .......... G05B 23/0229
700/62

(Continued)

FOREIGN PATENT DOCUMENTS

JP          5-72004        3/1993
JP          7-13617        1/1995
(Continued)

OTHER PUBLICATIONS

"Ben Gorman, R-Introduction to Factors Tutorial, Jul. 21, 2017, GormAnalysis, https://www.gormanalysis.com/blog/r-introduction-to-factors-tutorial/" (Year: 2014).*

(Continued)

*Primary Examiner* — Santosh R Poudel
(74) *Attorney, Agent, or Firm* — Wenderoth, Lind & Ponack, L.L.P.

(57) ABSTRACT

An acquisition unit is configured to acquire measurement values of a target device. A likelihood calculation unit is configured to calculate an occurrence likelihood for each of a plurality of phenomena that are liable to occur to the target device based on the measurement values acquired by the acquisition unit. A table storage unit is configured to store a (Continued)

table in which the plurality of phenomena and occurrence causes of abnormalities of the target device are associated to each other. As estimation unit is configured to estimate the occurrence causes based on the occurrence likelihood and the table.

9 Claims, 5 Drawing Sheets (51) Int. Cl.
    *F01D 25/00*      (2006.01)
    *F02C 7/00*      (2006.01)
    *F01D 25/08*      (2006.01)
    *F02C 7/22*      (2006.01)

(52) U.S. Cl.
    CPC .................. *F02C 7/00* (2013.01); *F02C 7/22* (2013.01); *G05B 23/02* (2013.01); *G05B 23/0221* (2013.01); *G05B 23/0235* (2013.01)

(56) References Cited

U.S. PATENT DOCUMENTS

| | | | | |
|---|---|---|---|---|
| 2005/0114743 | A1* | 5/2005 | Moorhouse | H04L 41/06 714/100 |
| 2007/0156373 | A1* | 7/2007 | Yamashita | F25B 49/005 702/182 |
| 2010/0198555 | A1 | 8/2010 | Takahama et al. | |
| 2011/0178977 | A1* | 7/2011 | Drees | H02J 13/00002 706/52 |
| 2012/0226474 | A1* | 9/2012 | Trejo Sanchez | G05B 23/0275 702/179 |
| 2017/0134087 | A1* | 5/2017 | Law | H04B 7/18506 |
| 2019/0018402 | A1* | 1/2019 | Enomoto | G05B 19/41875 |

FOREIGN PATENT DOCUMENTS

| | | |
|---|---|---|
| JP | 11-119823 | 4/1999 |
| JP | 3110060 | 11/2000 |
| JP | 2005-293169 | 10/2005 |
| JP | 2006-309570 | 11/2006 |
| JP | 2009-176315 | 8/2009 |
| JP | 2011-90382 | 5/2011 |
| JP | 2016-6594 | 1/2016 |
| WO | 2009/107805 | 9/2009 |

OTHER PUBLICATIONS

International Search Report dated Aug. 22, 2017 in corresponding International Application No. PCT/JP2017/020200.

Written Opinion of the International Searching Authority dated Aug. 22, 2017 in corresponding International Application No. PCT/JP2017/020200.

\* cited by examiner

MONITORING DEVICE, METHOD FOR MONITORING TARGET DEVICE, AND PROGRAM

TECHNICAL FIELD

The present invention relates to a monitoring device configured to monitor a target device, a method for monitoring the target devices and a program.

This application claims priority based on Japanese Patent Application No. 2016-110336 filed in Japan on Jun. 1, 2016, of which the contents are incorporated herein by reference.

BACKGROUND ART

There has been known a method using a fault tree analysis (FTA) as a method for specifying an occurrence cause of abnormality when the abnormality occurs to a plant (see, for example Patent Document 1).

CITATION LIST

Patent Document

Patent Document 1: JP 2009-176315 A

SUMMARY OF INVENTION

Problem to be Solved by the Invention

However, the estimation of the occurrence cause of the abnormality based on the FTA largely relies on experience of an observer. Thus, the estimation accuracy differs for each observer. Further, the number of observers who have a skill for estimating the occurrence cause of the abnormality based on the FTA is limited. Thus, when the abnormality occurs to the plant, it may take time to estimate the occurrence cause.

An object of the present invention is to provide a monitoring device, a method for monitoring a target device, and a program, which are capable of estimating an occurrence cause of abnormality with high accuracy without relying on experience of an observer.

Solution to Problem

According to a first mode of the present invention, a monitoring device includes an acquisition unit, a likelihood calculation unit, a table storage unit, and an estimation unit. The acquisition unit is configured to acquire measurement values of a target device. The likelihood calculation unit is configured to calculate an occurrence likelihood for each of a plurality of phenomena that are liable to occur to the target device based on the measurement values acquired by the acquisition unit. The table storage unit is configured to store a table in which the plurality of phenomena and occurrence causes of abnormalities of the target device are associated with one another. The estimation unit is configured to estimate the occurrence causes based on the occurrence likelihood and the table.

According to a second mode of the present invention, in the monitoring device of the first mode, the occurrence causes, the plurality of phenomena, and the number of times at which abnormalities occur due to the occurrence causes may be associated with one another in the table. The estimation unit may calculate a weighted sum of the occurrence likelihood and the number of times for each of the occurrence causes, and may estimate the occurrence causes based on a the weighted sum.

According to a third mode of the present invention, in the monitoring device of the first mode, the occurrence causes, the plurality of phenomena, and values indicating whether the plurality of phenomena are observed may be associated with one another in the table. The estimate unit may estimate the occurrence causes based on the number of occurrence of phenomena, which each have the occurrence likelihood being equal to or larger than a predetermined threshold value and are indicated to occur in the table, among the plurality of phenomena.

According to a fourth mode of the present invention, in the monitoring device of the first mode, the occurrence causes, the plurality of phenomena, and probabilities that the plurality of phenomena occur when abnormalities occur due to the occurrence causes may be associated with one another in the table. The estimate unit may calculate a weighted sum of the occurrence likelihood and the probabilities, and may estimate the occurrence causes based on the weight sum.

According to a fifth mode of the present invention, the monitoring device of any one of the first mode to the fourth mode may further include an SN ratio calculation unit configured to calculate an SN ratio of each of the measurement values acquired by the acquisition unit. The occurrence likelihood calculation unit may calculate the occurrence likelihood for each of the plurality of phenomena based on the SN ratio calculated by the SN calculation unit.

According to a sixth mode of the present invention, the monitoring device of any one of the first mode to the fifth mode may further include a distance calculation unit configured to calculate a Mahalanobis distance based on the measurement values. The occurrence likelihood calculation unit may calculate the occurrence likelihood for each of the plurality of phenomena when the Mahalanobis distance is equal to or greater than a predetermined value.

According to a seventh mode of the present invention, the monitoring device of the sixth mode may further include a correction unit configured to obtain a correction, measurement value by which the measurement values are corrected through thermal equilibrium calculations based on the measurement values. The measurement values may include at least a temperature and a flow rate of an input fluid to be input to the target device, and a temperature and a flow rate of an output fluid to be output from the target device. The distance calculation unit may calculate the Mahalanobis distance with a factor of the correction measurement value.

According to an eighth mode of the present invention, a method for monitoring a target device includes the following steps. That is, measurement values of the target device are acquired. An occurrence likelihood for each of a plurality of phenomena that are liable to occur to the target device is calculated based on the measurement values that are acquired. A table in which the plurality of phenomena and occurrence causes of abnormalities are associated with each other is stored. Then, the occurrence causes are estimated based on the occurrence likelihood.

According to a ninth mode of the present invention, in the method for monitoring a target device of the eight mode, the occurrence causes, the plurality of phenomena, and the number of times at which abnormalities occur due to the occurrence causes may be associated with one another in the table. A weighted sum of the occurrence likelihood and the number of times for each of the occurrence causes may be calculated, and the occurrence causes may be estimated based on the weighted sum.

According to a tenth mode of the present invention, in the method for monitoring a target device of the eight mode, the occurrence causes, the plurality of phenomena, and values indicating whether the plurality of phenomena are observed may be associated with one another in the table. The occurrence causes may be estimated based on the number of occurrence of phenomena, which each have the occurrence likelihood being equal to or larger than a predetermined threshold value and are indicated to occur in the table, among the plurality of phenomena.

According to an eleventh mode of the present invention, in the method for monitoring a target device of the eight mode, the occurrence causes, the plurality of phenomena, and probabilities that the plurality of phenomena occur when abnormalities occur due to the occurrence causes may be associated with one another in the table. A weighted sum of the occurrence likelihood and the probabilities may be calculated, and the occurrence causes may be estimated based on the weighted sum.

According to twelfth mode of the present invention, a program causes a computer to execute the following processing. That is, measurement values of the target device are acquired. An occurrence likelihood for each of a plurality of phenomena that are liable to occur to the target device is calculated based on the measurement values that are acquired. A table in which the plurality of phenomena and occurrence causes abnormalities are associated with one another is stored. Then, the occurrence causes are estimated based on the occurrence likelihood.

Advantageous Effect of Invention

According to at least one mode of the above-mentioned modes, the monitoring device calculates the occurrence likelihood for each of the plurality of phenomena that may occur to the target device based on the measurement values of the target device, and estimates the occurrence causes of the abnormalities that may occur to the target device through use of the table in which the phenomena and the occurrence causes of the abnormalities are associated. In this manner, the monitoring device can estimate the occurrence causes of the abnormalities with high accuracy without relying on experience of an observer.

DESCRIPTION OF EMBODIMENT

First Embodiment

Now, with reference to the drawings, detailed description is made of a first embodiment of the present invention.

A monitoring device 100 according to the first embodiment is configured to monitor presence or absence of abnormality in a gas turbine T and identify an occurrence cause of the abnormality. The gas turbine T is an example of a target device.

Target Device

Figure 1:
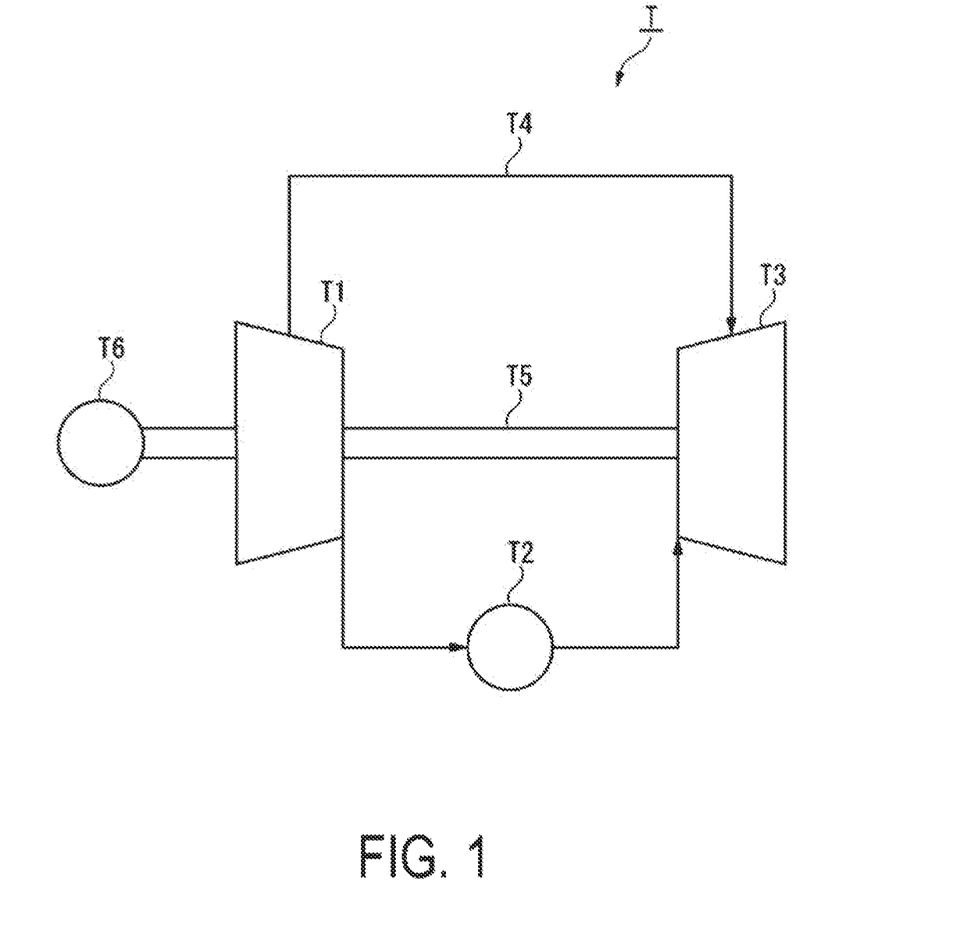
FIG. 1 is a schematic diagram of a gas turbine being an example of a target device.

FIG. 1 is a schematic diagram of the gas turbine being an example of the target device.

The gas turbine T includes a compressor T1, a combustor T2, a turbine T3, a rotor T5, an extraction pipe T4, and a generator T6. The compressor T1, the turbine T3, and the generator T6 are joined to the rotor T5, and are rotated about an axis of the rotor T5. The compressor T1 is rotated to take in air through an air inlet port, and compresses the intake air to generate compressed air. The combustor T2 sprays fuel to the compressed air generated by the compressor T1 to generate a combustion gas having a high temperature and a high pressure. Further, cooling steam is blown against the combustor T2 to cool the combustor T2. The turbine T3 converts a thermal energy of the combustion gas generated by the combustor T2 into a rotation energy for the rotor T5 to generate a driving force. The extraction pipe T4 has one end connected to the compressor T1 and the other end connected to the turbine T3. The extraction pipe T4 extracts part of the compressed air generated by the compressor T1 and supplies the compressed air that is extracted (cooling air) to the turbine T3 to cool the turbine T3. The generator T6 converts the rotation energy for the rotor T5 into an electric energy.

A plurality of sensors (not illustrated) are mounted to the gas turbine T. As sensor values acquired by the respective sensors, there are exemplified an atmospheric pressure, an atmospheric temperature, an atmospheric relative humidity, an inlet pressure difference of the compressor T1, an outlet air temperature of the compressor T1, an outlet air pressure of the compressor T1, a fuel pressure, a fuel temperature, a fuel heating value, a fuel composition, a fuel flow rate, a cooling steam pressure, a cooling steam temperature, a cooling steam flow rate, a cooling air temperature, a cooling air flow rate, an exhaust air temperature, a sucked air pressure loss, an exhaust air pressure loss, power generation efficiency of the generator T6, generated electric power, a power generation current, a power generation voltage, and a power generation frequency.

Configuration

Figure 2:
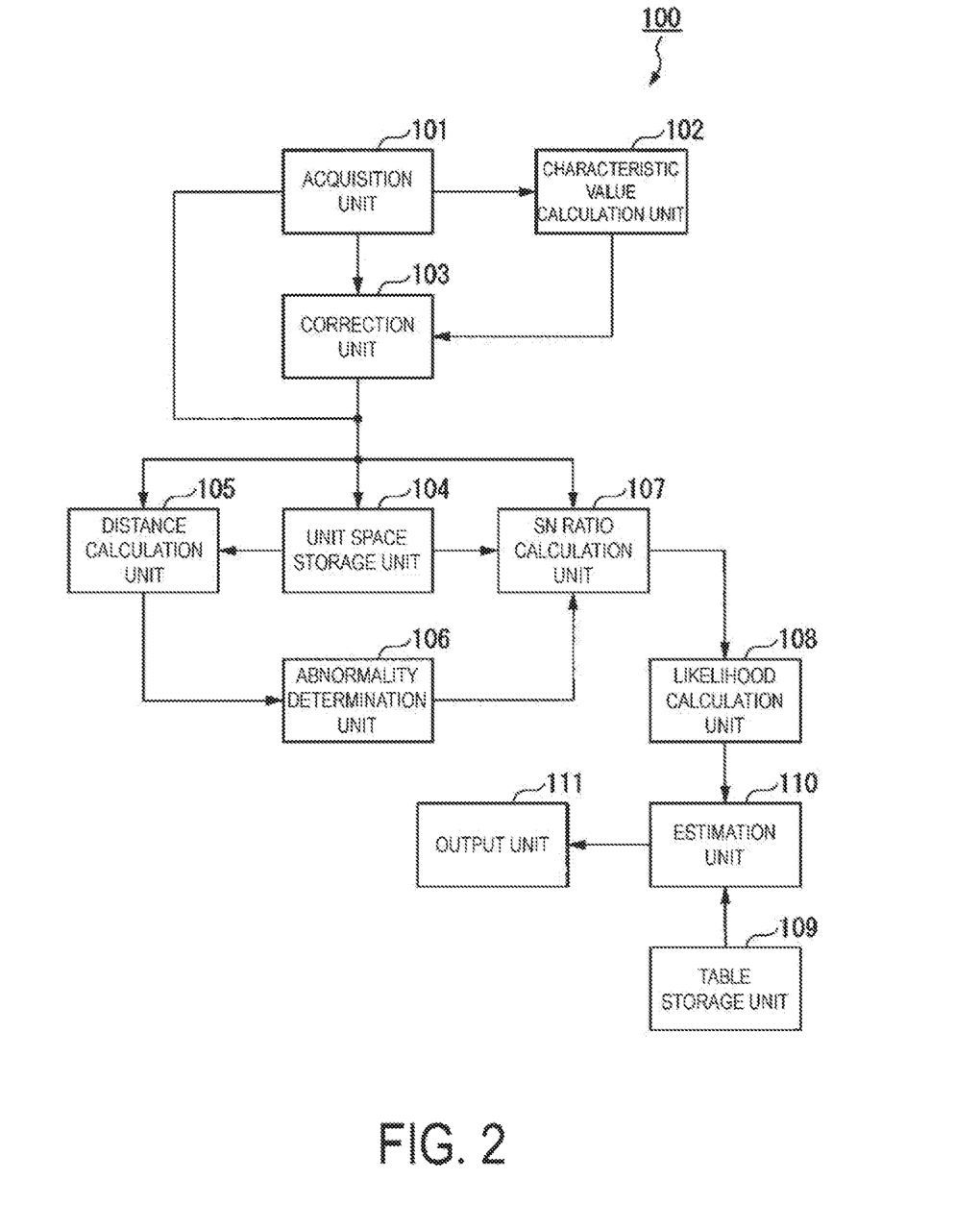
FIG. 2 is a schematic block diagram for illustrating the configuration of a monitoring device according to a first embodiment of the present invention.

Description is made of the configuration of the monitoring device 100. FIG. 2 is a schematic block diagram for illustrating the configuration of the monitoring device according to the first embodiment.

The monitoring device 100 includes an acquisition unit 101, a characteristic value calculation unit 102, a correction unit 103, a unit space storage unit 104, a distance calculation unit 105, an abnormality determination unit 106, an SN ratio calculation unit 107, a likelihood calculation unit 108, a table storage unit 109, an estimation unit 110, and an output unit 111.

The acquisition unit 101 acquires the sensor values acquired by the sensors provided to the gas turbine T and values (command values) of control signals of the gas turbine T. Note that, as described above, the sensor values acquired by the acquisition unit 101 include at least temperatures of air and fuel that are input to the gas turbine T (input fluid) and a temperature of exhaust air that is output from the gas turbine T (output fluid). The sensor values are examples of the measurement values of the gas turbine T.

The characteristic value calculation unit 102 calculates characteristic values for showing characteristics of the gas turbine T based on the sensor values acquired by the acquisition unit 101. As the characteristic values, there are exemplified thermal efficiency, compressor efficiency, combustion efficiency, turbine efficiency, compressor motive power, turbine output, a gas turbine air flow rate, a gas turbine exhaust air flow rate, a compressor pressure ratio, and an inlet combustion gas temperature of the turbine T3. For example, the characteristic value calculation unit 102 calculates the compressor efficiency (characteristic value) by subtracting a difference between an actual compressor outlet enthalpy and an actual compressor inlet enthalpy from a difference between a compressor outlet enthalpy and an inlet compressor inlet enthalpy in a case of an isentropic change. Each enthalpy is calculated by using a temperature and a pressure being the sensor values. The characteristic values are examples of the measurement values of the gas turbine T. Note that, as described above, the characteristic values calculated by the characteristic value calculation unit 102 include at least an air flow rate input to the gas turbine T and an exhaust air flow rate output from the gas turbine T.

The correction unit 103 corrects the sensor values acquired by the acquisition unit 101 and the characteristic values calculated by the characteristic value calculation unit 102 based on thermal equilibrium calculations for the gas turbine and then obtains a correction measurement value. Specifically, the correction unit 103 corrects the measurement values in the following procedure. First, the correction unit 103 substitutes the measurement values to the thermal equilibrium calculations for the gas turbine T, and calculates errors of the respective measurement values, which satisfy the thermal equilibrium calculations. Then, the correction unit 103 obtains a total of the errors calculated for the respective measurement values or a total of the squares of the values, and obtains the correction measurement value by selecting a combination of the errors for the respective measurement values so as to obtain the smallest total.

Specifically, the thermal equilibrium of the gas turbine T as a whole is expressed by Equation (1) below. The thermal equilibrium of the compressor T1 is expressed by Equation (2) below. The thermal equilibrium of the combustor T2 is expressed by Equation (3) below. The thermal equilibrium of the turbine T3 is expressed by Equation (4) below. In each of Equation (1) to Equation (4), the left hand side expresses heat input, and the right hand side expresses heat output.

[Math. 1]
$$G1 \times H1C + Gf \times Hf + Gf \times LHV \times \mu_{BURN} + Gst \times Hst1 = \frac{KWGEN/4.1868}{\mu_{GEN}} + G8 \times H2T + Gst \times Hst2 \quad (1)$$

[Math. 2]
$$G1 \times H1C + \frac{KWC}{4.1868} = G2 \times H2C + Gc \times Hc \quad (2)$$

[Math. 3]
$$G2 \times H2C + Gf \times Hf + Gf \times LHV \times \mu_{BURN} + Gst \times Hst1 + Gw \times Hw = Gst \times Hst2 + G4 \times H1T \quad (3)$$

[Math. 4]
$$G4 \times H1T + Gc \times Hc = G8 \times H2T + \frac{KWT}{4.1868} \quad (4)$$

A variable G1 expresses an intake flow rate. A variable H1C expresses an intake enthalpy. A variable G2 expresses as outlet flow rate of the compressor T1. A variable H2C expresses an outlet enthalpy of the compressor T1. A variable G1 expresses a fuel flow rate. A variable LHV expresses a fuel heating value. A variable Gst expresses a cooling steam flow rate. A variable Hst1 expresses an enthalpy of the cooling steam supplied to the combustor T2. A variable Hst2 expresses an enthalpy of the cooling steam discharged from the combustor T2. A variable Gc expresses a cooling air amount. A variable Hc expresses a cooling air enthalpy. A variable G4 expresses an inlet flow rate of the turbine T3. A variable H1T expresses an inlet enthalpy of the turbine T3. A variable G8 expresses an exhaust air flow rate. A variable H2T expresses an exhaust air enthalpy. A variable $\mu_{gen}$ expresses power generation efficiency. A variable $\mu_{burn}$ expresses combustion efficiency. A variable KWGEN expresses generated electric power. A variable KWC expresses a compressor motive power. A variable KWT expresses turbine output.

The unit space storage unit 104 stores the combination of the state quantities of the gas turbine T (the measurement values, the correction measurement value, and the command values) as a unit space of a Mahalanobis distance. The state quantities are acquired during a start-up period of the gas turbine T (for example, a period of two weeks from the latest time point of an operation start time point of a gas turbine T in a new article state and an operation start time point of a gas turbine T after completion of regular inspection).

The distance calculation unit 105 calculates a Mahalanobis distance indicating a state of the gas turbine T based on the unit space stored by the unit space storage unit 104 with the factors of the sensor values and the command values acquired by the acquisition unit 101, the characteristic values calculated by the characteristic value calculation unit 102, and the correction measurement value by which the correction unit 103 performs the correction. The Mahalanobis distance is a scale indicating a degree of a difference between a reference sample expressed as a unit space and a newly obtained sample. A method for calculating the Mahalanobis distance is described later.

The abnormality determination unit 106 determines whether abnormality occurs to the gas turbine T based on the Mahalanobis distance calculated by the distance calculation unit 105. Specifically, the abnormality determination unit 106 determines that abnormality occurs to the gas turbine T when the Mahalanobis distance is equal to or larger than a predetermined threshold value (for example, 3.5). Generally, a value equal to or greater than three is set as the threshold value.

When the abnormality determination unit 106 determines that abnormality occurs to the gas turbine T, the SN ratio calculation unit 107 calculates a signal-noise ratio (SN ratio) in the Taguchi method based on the sensor values and the command values acquired by the acquisition unit 101, the characteristic values calculated by the characteristic value calculation unit 102, and the correction measurement amount by which the correction unit 103 performs correction. That is, the likelihood calculation unit 108 obtains the SN ratio based on presence or absence of an item by an orthogonal table analysis. As the SN ratio is higher, it can be determined that abnormality is more liable to occur to the item of the state quantity (the measurement value or the command value).

Based on the SN ratio calculated by the SN ratio calculation unit 107, the likelihood calculation unit 108 calculates an occurrence likelihood for each of a plurality of phenomena (performance degradation) that may occur to the gas turbine T. As the phenomena, for example, there are exemplified reduction in gas turbine output, reduction in gas turbine efficiency, reduction compressor efficiency, reduction in turbine efficiency, reduction in compressor inlet air amount, increase in exhaust air temperature, increase compressor compression ratio, reduction in combustion efficiency, increase in turbine inlet gas temperature, and increase in exhaust gas pressure. For example, the likelihood calculation unit 108 stores, for each phenomenon, a relationship between presence or absence of occurrence of the phenomenon and the state quantity that is dominantly involved in increase or decrease of the SN ratio, and calculates a weighted sum of the SN ratio of the state quantity associated with each phenomenon. In this manner, the likelihood calculation unit 108 calculates an occurrence likelihood for each phenomenon.

The table storage unit 109 stores a table showing a relationship between the phenomena and occurrence causes of abnormalities. Specifically, for each phenomenon and each occurrence cause, the table storage unit 109 stores the number of times at which the phenomena are observed when the abnormality occurs due to the occurrence cause. For example, assuming that a state in which a deviation of a blade path temperature was large (phenomenon) was observed nine times in the past when abnormality due to damage of an exhaust air diffuser (occurrence cause) occurred, the table storage unit 109 associates the occurrence cause of "the damage of the exhaust air diffuser" and the phenomenon of "the state in which the deviation of the blade path temperature is large" with each other, and stores the number of times, which is nine. The table stored by the table storage unit 109 can be formed based on, for example, data of a fault tree (FT) analysis formed by a maintenance worker at the time of operation of the gas turbine T.

The estimation unit 110 estimates an occurrence cause of abnormality of the gas turbine T based on the occurrence likelihood of each phenomenon calculated by the likelihood calculation unit 108 and the table stored by the table storage unit 109. Specifically, the estimation unit 110 multiplies vectors in one row and M columns having the occurrence likelihoods of the respective phenomena as elements and a matrix in M rows and N columns having the values of the table as elements. In this manner, the estimation unit 110 obtains vectors in N rows and one column having the likelihoods of the occurrence causes of the abnormalities as elements. M expresses the number of phenomena, and N expresses the number of occurrence causes. Further, the estimation unit 110 can estimate that the occurrence cause in the row having the large element value among the obtained vectors in the N rows and the one column is the occurrence cause of the abnormality of the gas turbine T. That is, the estimation unit 110 calculates a weighted sum of the occurrence likelihood for each phenomenon and the number of occurrence of each phenomenon for each occurrence cause of the abnormality, and estimates the occurrence causes based on the weighted sum.

The output unit 111 outputs the occurrence causes estimated by the estimation unit 110 in an order of the likelihoods. As outputs, for example, there are exemplified displaying on a display screen, transmission of the data to the outside, printing on a sheet, and voice output.

Mahalanobis Distance

Here, description is made of a calculation expression for calculating a general Mahalanobis distance D.

The number of items of the plurality of state quantities (measurement values and command values) indicating the state of the gas turbine T is expressed by a value of "u". The value of "u" is an integer equal to or greater than two. The state quantities of the "u" items are expressed by $X_1$ to $X_u$, respectively. In a reference operation state of the gas turbine T (in the first embodiment, the operation state for two weeks from the latest time point of the operation start time point of the gas turbine T in a new article state and the operation start time point of the gas turbine T after the completion of the regular inspection), the monitoring device 100 collects "v (equal to or greater than two)" values for each of the state quantities $X_1$ to $X_u$ of the items. For example, when sixty values are acquired for each of the state quantities of the items, v=60 is satisfied. The "j"-th state quantity $X_1$ to the "j"th state quantity $X_u$ for each item collected in the operation state are expressed by $X_{1j}$ to $X_{uj}$, respectively. The value of "j" is any value (integer) from one to the value of "v", and indicates that there are "v" values for each state quantity. That is, the monitoring device 100 collects the state quantities $X_{11}$ to $X_{uv}$. The state quantities $X_{11}$ to $X_{uv}$ are stored in the unit space storage unit 104.

The monitoring device 100 obtains an average value $M_i$ and a standard deviation $\sigma_i$ (degree of non-uniformity of the reference data) of the state quantities $X_{11}$ to $X_{av}$ for each item with Equation (5) and Equation (6). The number of items (the number of state quantities, integer) is expressed by the value i. Here, the value i is set to one to the value of "u", and expresses a value corresponding to the state quantities $X_1$ to $X_u$. Here, the standard deviation is a positive square root of an expected value of a square of a difference between the state quantity and the average value.

[Math. 5]

$$M_i = \frac{1}{v}\sum_{j=1}^{v} X_{ij} \quad (5)$$

[Math. 6]

$$\sigma_i = \sqrt{\frac{1}{v-1}\sum_{j=1}^{v}(X_{ij} - M_i)^2} \quad (6)$$

The average value $M_i$ and the standard deviation $\sigma_i$ are the state quantities indicating characteristics. The monitoring device 100 converts the state quantities $X_{11}$ to $X_{av}$ into normalized state quantities $x_{11}$ $x_{av}$ with Equation (7) below by using the average value $M_i$ and the standard deviation $\sigma_i$ that are computed. That is, an abnormality monitoring device 10 converts the state quantity $X_{ij}$ of the gas turbine T into a random variable $x_{ij}$ given an average of zero and a standard deviation of one. Not that, in Equation (7) below, the value j is any value (integer) from one to the value of "v". That is, the value of "v" is the number of state quantities for each item.

[Math. 7]

$$x_{ij} = \frac{X_{ij} - M_i}{\sigma_i} \quad (7)$$

In order to perform an analysis with the data in which variates are normalized to be gives the average of zero and the variance of one, the monitoring device 100 specifies a correlation of the state quantities $X_{11}$ to $X_{uv}$. That is, the monitoring device 100 defines a covariance matrix (correlation matrix) R indicating a relationship between the variances and an inverse matrix $R^{-1}$ of the covariance matrix (correlation matrix) in Equation (8) below. Note that, in Equation (8) below, a value or "k" is the number of items (the number of state quantities). That is, the value of "k" and the value of "u" are equal to each other. Further, the value of "i" and a value of "p" are values for each state quantity, and are values from one to the value of "u" here.

[Math. 8]

$$R = \begin{pmatrix} 1 & r_{12} & \cdots & r_{1k} \\ r_{21} & 1 & \cdots & r_{2k} \\ \vdots & \vdots & \ddots & \vdots \\ r_{k1} & r_{k2} & \cdots & 1 \end{pmatrix} \quad (8)$$

$$R^{-1} = \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix} = \begin{pmatrix} 1 & r_{12} & \cdots & r_{1k} \\ r_{21} & 1 & \cdots & r_{2k} \\ \vdots & \vdots & \ddots & \vdots \\ r_{k1} & r_{k2} & \cdots & 1 \end{pmatrix}^{-1}$$

$$r_{ip} = r_{pi} = \frac{1}{v}\sum_{j=1}^{v} X_{ij} X_{pj}$$

After the computing processing as described above, the monitoring device 100 obtains the Mahalanobis distance D being the state quantity indicating a characteristic based on Equation (9) below. Note that, in Expression (9), the value of "j" is any value (integer) from one to the value of "v". That is, the value of "v" is the number of state quantities for each item. Further, the value of "k" is the number of items (the number of state quantities). That is, the value of "k" and the value of "u" are equal to each other. Further, values of "$a_{11}$" to "$a_{kk}$" are coefficients of the inverse matrix $R^{-1}$ of the covariance matrix shown in Equation (8) described above.

[Math. 9]

$$D_j^2 = \frac{1}{k}(x_{ij}, x_{2j}, \ldots, x_{kj}) \cdot \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix} \begin{pmatrix} x_{1j} \\ x_{2j} \\ \vdots \\ x_{kj} \end{pmatrix} = \quad (9)$$

$$\frac{1}{k}\sum_{l=1}^{k}\sum_{p=1}^{k} a_{ip} x_{ij} x_{pj} = \frac{1}{k}(x_{ij}, x_{2j}, \ldots, x_{kj}) \cdot R^{-1} \cdot \begin{pmatrix} x_{1j} \\ x_{2j} \\ \vdots \\ x_{kj} \end{pmatrix}$$

The Mahalanobis distance D is the reference data. The average value of the Mahalanobis distance D of the unit space is one. In a state in which the state quantity of the gas turbine T is normal, the Mahalanobis distance D stays equal to or less than approximately three. However, in a state is which the state quantity of the gas turbine T is abnormal, the value of the Mahalanobis distance D is greater than approximately three. As described above, the Mahalanobis distance D has a property that the value becomes greater in accordance with a degree of abnormality of the state quantity of the gas turbine T (degree of separation from the unit space).

Method for Monitoring Gas Turbine

Figure 3:
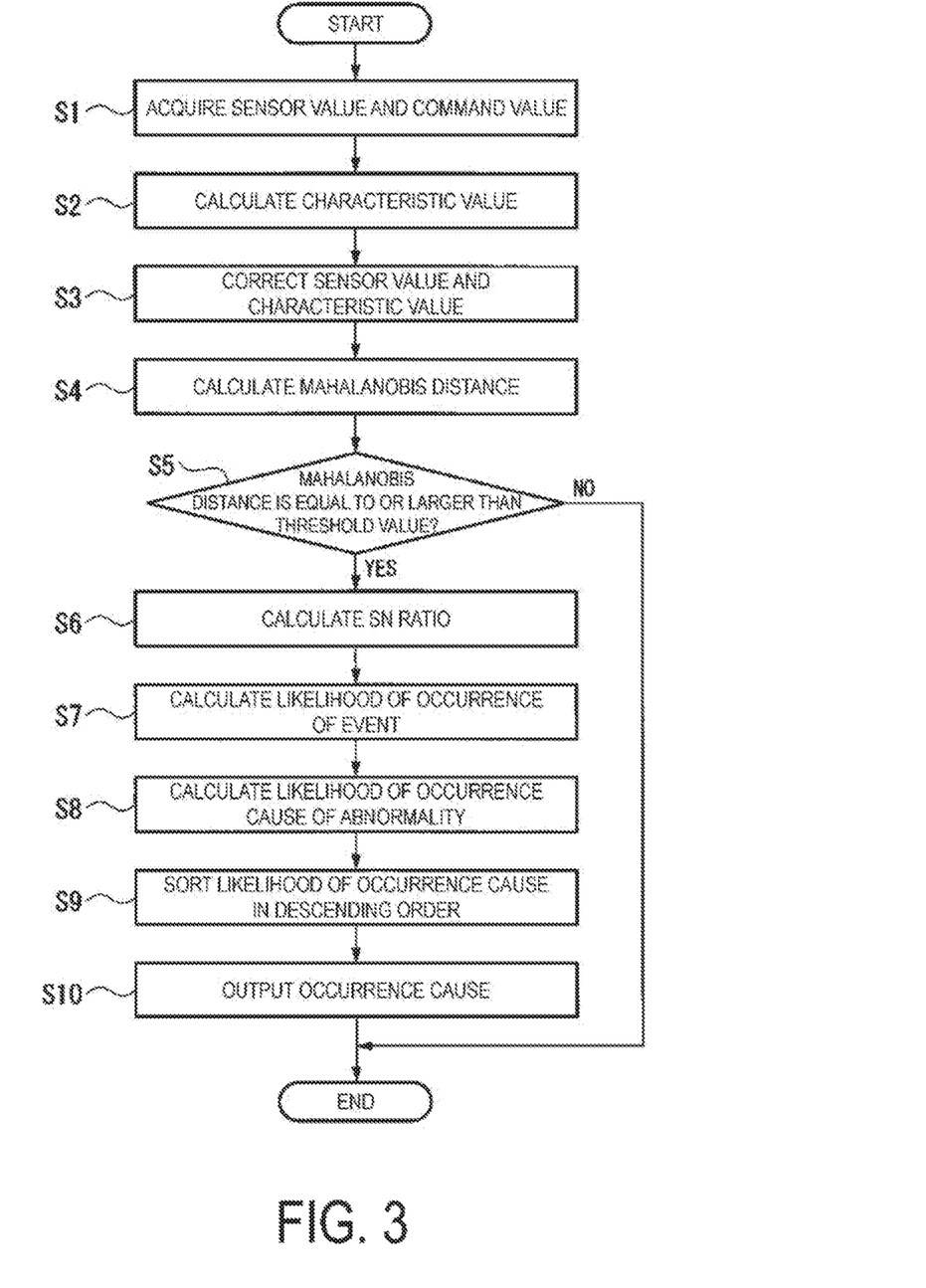
FIG. 3 is a flowchart for illustrating operations of the monitoring device according to the first embodiment.

Next, description is made of a method for monitoring the gas turbine, which is performed by the monitoring device 100. FIG. 3 is a flowchart for illustrating the operations of the monitoring device according to the first embodiment.

During the start-up period of the gas turbine T, the monitoring device 100 collects the state quantities of the gas turbine T, and causes the unit space storage unit 104 to store the combinations of the state quantities. That is, the monitoring device 100 associates the command values of the gas turbine acquired by the acquisition unit 101 and the correction measurement value formed by the correction unit 103, and records the values in the unit space storage unit 104. After the elapse of the start-up period of the gas turbine T, the monitoring device 100 performs monitoring operations as described below at a predetermined monitoring timing (for example, every hour). The monitoring timing is an example of a certain time point after the start-up, which is the time point after the elapse of the predetermined start-up period from the operation start time point of the gas turbine T.

When the monitoring device 100 starts monitoring, the acquisition unit 101 acquires tire sensor values acquired by the sensors provided to the gas turbine T and the command values of the gas turbine T (Step S1). Subsequently, the characteristic value calculation unit 102 calculates the characteristic values of the gas turbine T based on the sensor values acquired by the acquisition unit 101 (Step S2). Subsequently, the correction unit 103 corrects the sensor values and the characteristic values based on the thermal equilibrium calculations of the gas turbine T, and obtains the correction measurement value (Step S3).

Subsequently, the distance calculation unit 105 calculates the Mahalanobis distance based on the unit space stored by the unit space storage unit 104 with the factors of the sensor values and the command values acquired in Step S1, the characteristic values calculated in Step S2, and the correction measurement value obtained in Step S3 (Step S4). Subsequently, the abnormality determination unit 106 determines whether the calculated Mahalanobis distance is equal to or larger than the predetermined threshold value (Step S5).

When, the Mahalanobis distance is smaller than the threshold value (NO in Step S5), the abnormality determination unit 106 determines that abnormality does not occur to the gas turbine T. The monitoring device terminates the monitoring processing, and waits for the next monitoring timing.

In contrast, when the Mahalanobis distance is equal to or larger than the threshold value (YES in Step S5), the abnormality determination unit 106 determines that abnormality occurs to the gas turbine T.

When the abnormality determination unit 106 determines that the abnormality occurs to the gas turbine T, the SN ratio calculation unit 107 calculates the SN ratio in the Taguchi method for each of the command values acquired in Step S1 and the correction measurement value obtained in Step S3 (Step S6). The likelihood calculation unit 108 calculates the occurrence likelihood for each of the plurality of phenomena that may occur to the gas turbine T based on she calculated SN ratio (Step S7).

Subsequently, the estimation unit 110 multiplies the vectors having the occurrence likelihoods of the respective phenomena, which are calculated by the likelihood calculation unit 108, as elements and the matrix having the values of the table stored by the table storage unit 109 as elements. In this manner, the estimation unit 110 obtains the vectors having the likelihoods of the occurrence causes of the abnormalities as elements (Step S8). Subsequently, the estimation unit 110 sorts the occurrence causes in the descending order of the likelihoods indicated by the obtained vectors (Step S9). Then, the output unit 111 outputs the occurrence causes estimated by the estimation unit 110 in the sorted order (Step S10). For example, the output unit 111 causes the occurrence cause having the highest likelihood to be displayed on a display screen. When a display command for the next occurrence cause is received through control by a user, the output unit 111 causes the occurrence cause having the second-highest likelihood to be displayed on the display screen. Further, for example, the output unit 111 causes a list of the occurrence causes to be printed on a sheet in the descending order of the likelihoods.

Operational Effects

As described above, according to the first embodiment, the monitoring device 100 calculates the occurrence likelihood for each of the plurality of phenomena that may occur to the gas turbine T, and estimates the occurrence causes of the abnormalities based on the likelihood and the table for showing the relationship between the phenomena and the occurrence causes of the abnormalities. In this manner, the monitoring device 100 can output the occurrence cause of the abnormality based on the observed phenomenon.

Further, the monitoring device 100 according to the first embodiment multiplies vectors in one row and M columns having the occurrence likelihood for the respective phenomena as elements and a matrix in M rows and N columns having the values of the table as elements. In this manner, the estimation unit 110 obtains vectors in N rows and one column having the likelihoods of the occurrence causes of the abnormalities as elements. With this, through a simple calculation, the monitoring device 100 can easily specify the likelihood for each occurrence causes of the abnormality. Note that, the configurations in the other embodiments are not limited thereto. For example, the monitoring device 100 according to the other embodiments may calculate a degree of cosine similarity between vectors in one row and M columns having the occurrence likelihoods for the respective phenomena as elements and each raw vector in a matrix in M rows and N columns having the values of the table as elements. In this manner, the monitoring device 100 may obtain vectors in N rows and one column having the likelihoods of the occurrence causes of the abnormalities as elements. Note that, the degree of cosine similarity is a value obtained by dividing an inner product of the vectors (weighted sum of the occurrence likelihoods for the respective phenomena and the numbers of occurrence of the respective phenomena) by a product of the vector norms. For example, the monitoring device 100 according to the other embodiments may obtain the weighted sum of the occurrence likelihoods for the respective phenomena and the numbers of occurrence of the respective phenomena for each occurrence cause of the abnormality without a matrix calculation.

Further, in the monitoring device 100 according to the first embodiment, the measurement values including the temperatures and the flow rates of the air and the fuel that are input to the gas turbine T and the temperature and the flow rate of the exhaust air that is output from the gas turbine T are corrected by the thermal equilibrium calculations. In this manner, the monitoring device 100 calculates the Mahalanobis direction. With this, the monitoring device 100 can calculate the Mahalanobis distance while suppressing measurement errors of the sensors provided to the gas turbine T. Note that, the other embodiments are not limited thereto. For example, the monitoring device 100 according to the other embodiments may calculate the Mahalanobis distance without the correction of the measurement values. Further, the monitoring device 100 according to the other embodiments may determine presence or absence of the abnormality of the gas turbine T based on a method other than the abnormality determination method based on the Mahalanobis distance.

Further, according to the first embodiment, the monitoring device 100 calculates the Mahalanobis distance with the factors of the measurement values acquired at the time point after the start-up, which is the time point after the elapse of the predetermined start-up period from the operation start time point of the gas turbine T, and with the unit space of the measurement values acquired during the start-up period. That is, the monitoring device 100 calculates the Mahalanobis distance with the unit space in the normal operation state of the gas turbine T itself being a subject to be monitored. In the related art, as the unit space of the Mahalanobis distance, the Mahalanobis distance is calculated based on the unit spaces in an operation state in which degradation occurs but abnormality docs not occur after the elapse of the start-up period and in other operation states of the gas turbine T. Meanwhile, according to the first embodiment, the Mahalanobis distance is calculated based on the unit space only in the operation state of the gas turbine T itself being the subject to be monitored before occurrence of degradation. With this, the monitoring device 100 can perform the abnormality detection for the gas turbine T being the subject to be monitored with high accuracy.

Further, the start-up period in the first embodiment is a period which starts from the latest time point of the operation start time point in a new article condition and the operation start time point after the completion of the regular inspection. That is, whenever the regular inspection is performed, the unit space of the Mahalanobis distance is updated. In this manner, with the normal operation state after the regular inspection for the gas turbine T (the operation state in a new article state at first) as a reference, the abnormality detection for the gas turbine T can be performed. In a case of the space unit in a new article state, that is, the operation state of the gas turbine without degradation, the Mahalanobis distance is relatively large even when the operation state of the gas turbine T after the regular inspection is the normal state. This is because degradation caused by use of the gas turbine T is difficult to be completely removed through the regular inspection. Therefore, with the normal operation state of the gas turbine T after the regular inspection as a reference, the abnormality detection for the gas turbine T is performed. Accordingly, the operation state can be determined with high accuracy.

Further, according to the first embodiment, the monitoring device 100 calculates the Mahalanobis distance with the factors of the measurement values, the correction measurement value, and the command values. With this, even when the balance between the heat input and the heat output collapses due to, for example, the degradation of the gas turbine T, the state of the gas turbine T can suitably be evaluated. Note that, the configurations in the other embodiments are not limited thereto. For example, the monitoring device 100 according to the other embodiments may calculate the Mahalanobis distance with the factor of the correction measurement value and without the factors of the measurement values. Further, the monitoring device 100 according to the other embodiments may calculate the Mahalanobis distance without the factors of the command values.

Second Embodiment

Now, with reference to the drawings, detailed description is made of a second embodiment of the present invention.

Figure 4:
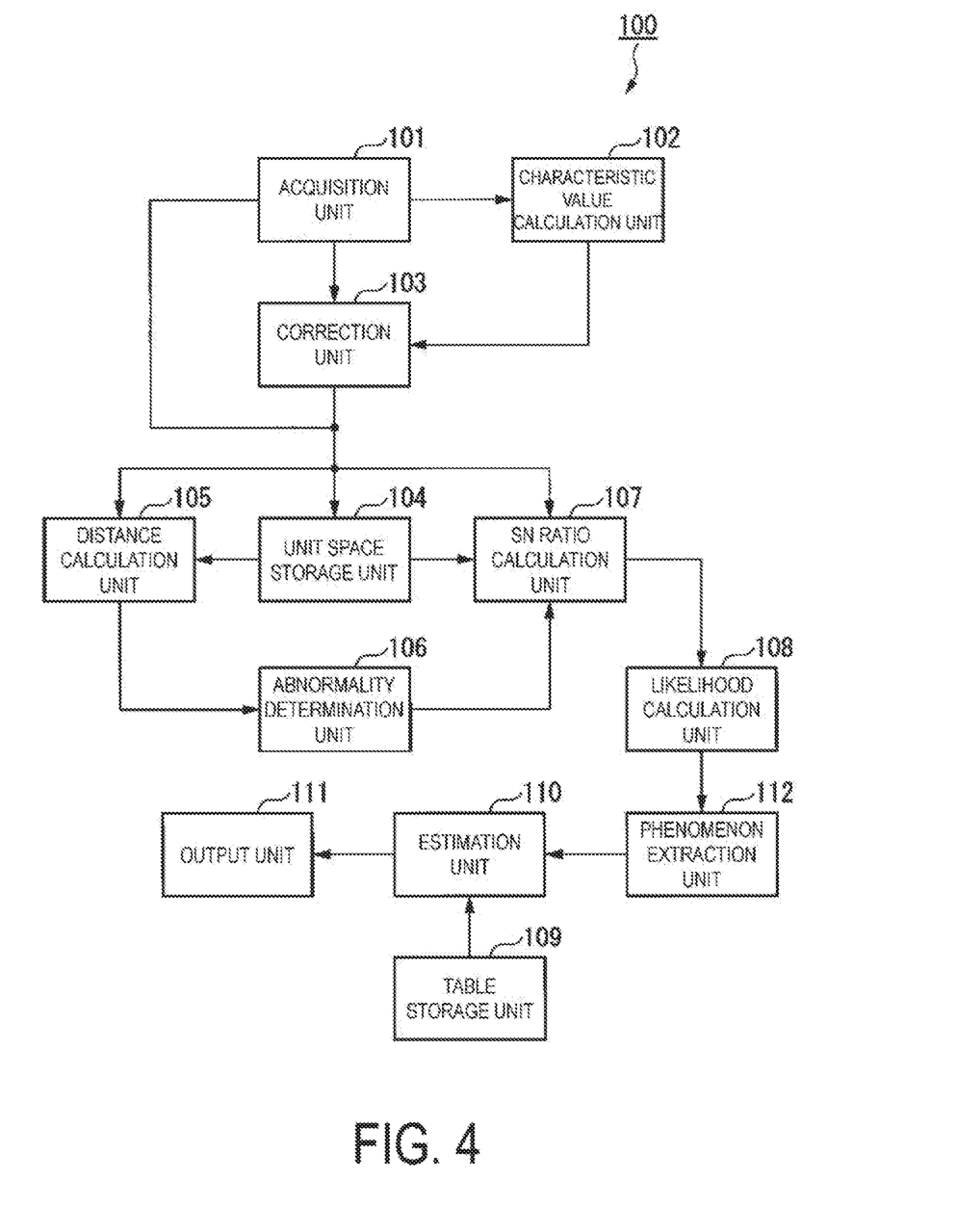
FIG. 4 is a schematic block diagram for illustrating the configuration of a monitoring device according to a second embodiment of the present invention.

FIG. 4 is a schematic block diagram for illustrating the configuration of the monitoring device according to the second embodiment.

The monitoring device 100 according to the second embodiment includes a phenomenon extraction unit 112 in addition to the configuration in the first embodiment, and is different in operation of the estimation unit 110 from that in the first embodiments. The phenomenon extraction unit 112 extracts phenomena having likelihoods estimated by the likelihood calculation unit 108, which are equal to or larger than a threshold value, among the plurality of phenomena that may occur to the gas turbine T. The estimation unit 110 counts the numbers of occurrence of the phenomena, which occur once or more, among the phenomena extracted by the phenomenon extraction unit 112 in the table stored by the table storage unit 109. The estimation unit 110 estimates that the occurrence cause, which has the relatively large counted number of occurrence, among the plurality of occurrence causes is the occurrence cause of the abnormality of the gas turbine T. Specifically, the estimation unit 110 sorts the occurrence causes in the descending order of the numbers of occurrence, and outputs the resultant to the output unit 111.

The monitoring device 100 has the above-mentioned configuration. Accordingly, the monitoring device 100 can easily output the occurrence cause of the abnormality based on the observed phenomenon with a simple configuration as compared to that in the first embodiment.

Note that, similarly to the first embodiment, for each phenomenon and each occurrence cause, the table storage unit 109 in the second embodiment stores the number of times at which the phenomenon is observed when the abnormality occurs due to the occurrence cause. However, the table storage unit 109 is not limited thereto. For example, the table storage unit 109 in the other embodiments may store a Boolean value in association with each phenomenon and each occurrence cause. The Boolean value indicates whether the phenomenon is observed when the abnormality occurs due to the occurrence cause. In this case, the estimation unit 110 counts the number of occurrence of the phenomenon, which has the Boolean value indicating "True", among the phenomena extracted by the phenomenon extraction unit 112 in the table stored by the table storage unit 109. The estimation unit 110 estimates that the occurrence cause, which has the relatively large counted number of the Boolean value, among the plurality of occurrence causes is the occurrence cause of the abnormality of the gas turbine T.

Third Embodiment

Now, with reference to FIG. 2, detailed description is made of a third embodiment of the present invention.

The monitoring device 100 according to the third embodiment is different in information stored by the table storage unit 109 from that in the first embodiment. The table storage unit 109 in the third embodiment stores a probability that the phenomenon is observed when the abnormality occurs due to the occurrence cause in association with each phenomenon and each occurrence cause. The table can be formed based on, for example, FTA data (FT) formed by a maintenance worked at the time of operation of the gas turbine T. The FT is a tree structure in which a top phenomena is set as a highest-position phenomenon (root) and lower phenomena being causes of the higher phenomenon are set as nodes. Each node is associated with a probability that the higher phenomenon, which is relevant to a node right above the node, occurs due to the lower phenomenon indicated by the node. The probability associated with the node indicating each phenomenon in the FT is stored in the table. Accordingly, the table of the table storage unit 109 is generated.

With this, the estimation unit 110 calculates a weighted sum of the occurrence likelihoods for each phenomenon calculated by the likelihood calculation unit 108 and the occurrence probability of each phenomenon, and estimates the occurrence causes based on the weighted sum. Specifically, the estimation unit 110 sorts the occurrence causes in the descending order of the likelihoods, the occurrence probabilities, and the weighted sums, and outputs the resultant to the output unit 111. That is, the estimation unit 110 performs Bayesian update based on the prior probability of the phenomenon (probability stored in the table) and the observation result of the phenomenon (occurrence likelihood for the phenomenon), and obtains the occurrence probability of the occurrence cause as the posterior probability.

As described above, according to this embodiment, the occurrence cause of the abnormality can easily be output with higher accuracy based on the observed phenomenon as compared to the first embodiment and the second embodiment.

Note that, the monitoring device 100 according to the third embodiment stores the probability determined based on the FT in association with each phenomena and each occurrence cause, but is not limited thereto. For example, the probability stored in the table in the other embodiments may be a sum of the occurrence likelihoods for the respective phenomena calculated during the operation of the gas turbine T in the past.

Further, the monitoring device 100 according to the third embodiment uses the weighted sum of the likelihoods and the probabilities of the respective phenomena, but is not limited thereto. For example, the monitoring device 100 according to the other embodiments may calculate a degree of cosine similarity between vectors in one row and M columns having the occurrence likelihoods for the respective phenomena as elements and each raw vector in a matrix in M rows and N columns having the values of the table as elements. In this manner, the monitoring device 100 may obtain vectors in N rows and one column having the likelihoods of the occurrence causes of the abnormalities as elements.

With reference to the drawings, detailed description is made of the embodiment above. However, the specific configuration is not limited to the one described above, and various design changes and the like can be made.

For example, the subject device is the above-mentioned embodiments is the gas turbine T, but is not limited is the other embodiments. For example, the subject device is the other embodiments may be a steam turbine, an engine, and other devices having thermal input and output.

Further, the likelihood calculation unit 108 of the monitoring device 100 according to the above-mentioned embodiments obtains the occurrence likelihoods for the respective phenomena based on the SN ratio relevant to the Mahalanobis distance, but is not limited thereto. For example, the likelihood calculation unit 108 in the other embodiments may calculate the likelihoods for the respective phenomena through use of a Bayesian network in which the measurement values acquired by the acquisition unit 101 are input.

Figure 5:
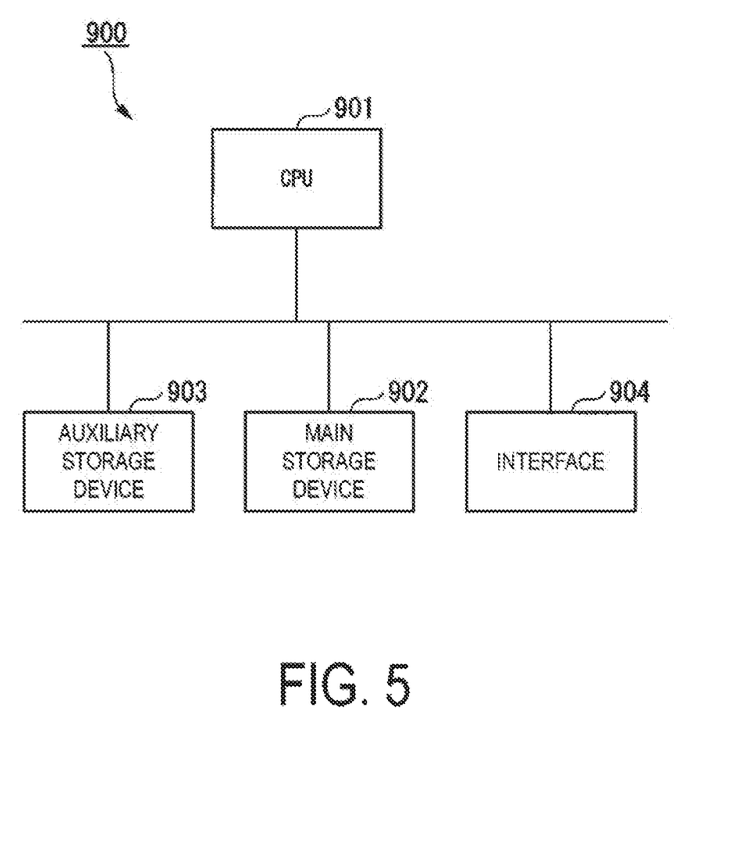
FIG. 5 is a schematic block diagram for illustrating the configuration of a computer in at least one of the embodiments.

FIG. 5 is a schematic block diagram for illustrating the configuration of a computer in at least one of the embodiments.

A computer 900 includes a CPU 901, a main storage device 902, an auxiliary storage device 903, and an interface 904.

The monitoring device 100 described above includes the computer 900. Further, the operations of the respective processing units described above are stored in a form of a program in the auxiliary storage device 903. The CPU 901 reads the program from the auxiliary storage device 903, develops the program to the main storage device 902, and executes the above-mentioned processing in accordance with the program. Further, the CPU 901 secures storage areas corresponding to the respective storage units described above in the main storage device 902 in accordance with the program.

Note that, in at least one of the embodiments, the auxiliary storage device 903 is an example of a non-temporary concrete medium. As other non-temporary concrete mediums, for example, there are exemplified a magnetic disk, a magneto-optic disk, a laser disk, and a semiconductor memory, which are to be connected through the interface 904. Further, when this program is distributed to the computer 900 through a communication line, the computer 900 receiving the distribution may develop the program to the main storage device 902, and may execute the above-mentioned processing.

Further, the program may achieve some of the functions described above. In addition, the program may achieve the functions described above in combination with other programs already stored in the auxiliary storage device 903, that is, may be differential files (differential programs).

INDUSTRIAL APPLICABILITY

According to at least one mode of the above-mentioned modes, the monitoring device calculates the occurrence likelihood for each of the plurality of phenomena that may occur to the target device based on the measurement values of the target device, and estimates the occurrence causes of the abnormalities that may occur to the target device through use of the table in which the phenomena and the occurrence causes of the abnormalities are associated. In this manner, the monitoring device can estimate the occurrence causes of the abnormalities with high accuracy without relying on experience of an observer.

REFERENCE SIGNS LIST

100 Monitoring device
101 Acquisition unit
102 Characteristic value calculation unit
103 Correction unit
104 Unit space storage unit
105 Distance calculation unit
106 Abnormality determination unit
107 SN ratio calculation unit
108 Likelihood calculation unit
109 Table storage unit
110 Estimation unit
111 Output unit
112 Phenomenon extraction unit
T Gas turbine

The invention claimed is:

1. A monitoring device, comprising:
a memory configured to store instructions; and
a processor circuit configured to execute the instructions to:
acquire measurement values of a target device, the measurement values including at least a temperature and a flow rate of an input fluid to be input to the target device, and a temperature and a flow rate of an output fluid to be output from the target device;
obtain correction measurement values in which the measurement values are corrected by using thermal equilibrium calculations based on the measurement values;
calculate a Mahalanobis distance with a factor of the correction measurement values:
when the calculated Mahalanobis distance is equal to or larger than a predetermined value, calculate an SN ratio related to the Mahalanobis distance and obtain likelihoods by calculating a likelihood associated with an occurrence of each of M kinds of phenomena that are liable to occur to the target device based on the SN ratio for each of the phenomena, wherein a number of the likelihoods is M that is same as a number of the kinds of phenomena;
store a table in which each of the M kinds of phenomena and occurrence causes of N kinds of abnormalities of the target device are associated with one another;
estimate the occurrence causes of abnormalities based on a vector including N elements that is obtained by calculation using a vector including the M likelihoods as elements and a matrix including values of the table as elements; and
output the estimated occurrence causes of the abnormalities of the target device to a display screen or print the estimated occurrence causes of the abnormalities of the target device on a sheet.

2. The monitoring device according to claim 1,
wherein, in the table, the occurrence causes of N kinds of abnormalities, the M kinds of phenomena, and the number of times at which the phenomena are observed when abnormalities occur due to the occurrence causes of N kinds of abnormalities are associated with one another, and
wherein the processor calculates a weighted sum of the occurrence likelihood and the number of times for each of the occurrence causes of N kinds of abnormalities, and estimates the occurrence causes of abnormalities based on the weighted sum.

3. The monitoring device according to claim 1,
wherein, in the table, the occurrence causes of N kinds of abnormalities, the M kinds of phenomena, and values indicating whether the plurality of phenomena are observed when abnormalities occur due to the occurrence causes of N kinds of abnormalities are associated with one another, and
wherein the processor estimates the occurrence causes of abnormalities based on the number of the elements including value that indicates the occurrence of phenomena in the matrix, which each have the occurrence likelihood being equal to or larger than a predetermined threshold value, among the plurality of phenomena.

4. The monitoring device according to claim 1,
wherein, in the table, the occurrence causes of N kinds of abnormalities, the M kinds of phenomena, and probabilities that the plurality of phenomena occur when abnormalities occur due to the occurrence causes of N kinds of abnormalities are associated with one another, and wherein the processor calculates a weighted sum of the occurrence likelihood and the probabilities for each of the occurrence causes of N kinds of abnormalities, and estimates the occurrence causes of abnormalities based on the weighted sum.

5. A method for monitoring a target device, comprising:

acquiring, by a monitoring device, measurement values of the target device, the measurement values including at least a temperature and a flow rate of an input fluid to be input to the target device, and a temperature and a flow rate of an output fluid to be output from the target device;

obtaining, by a monitoring device, correction measurement values in which the measurement values are corrected by using thermal equilibrium calculations based on the measurement values;

calculating, by a monitoring device, a Mahalanobis distance with a factor of the correction measurement values;

when the calculated Mahalanobis distance is equal to or larger than a predetermined value, calculating, by a monitoring device, an SN ratio related to the Mahalanobis distance and obtaining, by the monitoring device, likelihoods by calculating a likelihood associated with an occurrence of each of M kinds of phenomena that are liable to occur to the target device based on the SN ratio for each of the phenomena;

estimating, by the monitoring device, occurrence causes of abnormalities based on a vector including N elements that is obtained by calculation using a vector including the likelihoods as elements and a matrix including values of a table as elements in which each of the M kinds of phenomena and the occurrence causes of N kinds of abnormalities of the target device are associated with one another, wherein a number of the likelihoods is M that is same as a number of the kinds of phenomena; and outputting the estimated occurrence causes of the abnormalities of the target device to a display screen or printing the estimated occurrence causes of the abnormalities of the target device on a sheet.

6. The method for monitoring a target device according to claim 5, wherein, in the table, the occurrence causes of N kinds of abnormalities, the M kinds of phenomena, and the number of times at which the phenomena are observed when abnormalities occur due to the occurrence causes of N kinds of abnormalities are associated with one another, and wherein the monitoring device calculates a weighted sum of the occurrence likelihood and the number of times for each of the occurrence causes of N kinds of abnormalities, and estimates the occurrence causes of abnormalities based on the weighted sum.

7. The method for monitoring a target device according to claim 5, wherein, in the table, the occurrence causes of N kinds of abnormalities, the M kinds of phenomena, and values indicating whether the plurality of phenomena are observed when abnormalities occur due to the occurrence causes of N kinds of abnormalities are associated with one another, and wherein the monitoring device estimates the occurrence causes of abnormalities based on the number of the elements including value that indicates the occurrence of phenomena in the matrix, which each have the occurrence likelihood being equal to or larger than a predetermined threshold value, among the plurality of phenomena.

8. The method for monitoring a target device according to claim 5, wherein, in the table, the occurrence causes of N kinds of abnormalities, the M kinds of phenomena, and probabilities that the plurality of phenomena occur when abnormalities occur due to the occurrence causes of N kinds of abnormalities are associated with one another, and wherein the monitoring device calculates a weighted sum of the occurrence likelihood and the probabilities for each of the occurrence causes of N kinds of abnormalities, and estimates the occurrence causes of abnormalities based on the weighted sum.

9. A non-transitory computer-readable medium having a program stored thereon, the program causing a computer to execute the following processing:

acquiring measurement values of the target device, the measurement values including at least a temperature and a flow rate of an input fluid to be input to the target device, and a temperature and a flow rate of an output fluid to be output from the target device;

obtaining correction measurement values in which the measurement values are corrected by using thermal equilibrium calculations based on the measurement values;

calculating a Mahalanobis distance with a factor of the correction measurement values;

when the calculated Mahalanobis distance is equal to or larger than a predetermined value, calculating an SN ratio related to the Mahalanobis distance and obtaining likelihoods by calculating a likelihood associated with an occurrence of each of M kinds of phenomena that are liable to occur to the target device based on the SN ratio for each of the phenomena;

estimating occurrence causes of abnormalities based on a vector including N elements that is obtained by calculation using a vector including the likelihoods as elements and a matrix including values of the table as elements in which each of the M kinds of phenomena and the occurrence causes of N kinds of abnormalities of the target device are associated with one another, wherein a number of the likelihoods is M that is same as a number of kinds of phenomena; and outputting the estimated occurrence causes of the abnormalities of the target device to a display screen or printing the estimated occurrence causes of the abnormalities of the target device on a sheet.

* * * * *